US008146140B2

(12) United States Patent
Lindem, III et al.

(10) Patent No.: US 8,146,140 B2
(45) Date of Patent: Mar. 27, 2012

(54) MOBILE IP BULK REGISTRATION REVOCATION

(75) Inventors: Alfred C. Lindem, III, Cary, NC (US); Anand K. Oswal, Sunnyvale, CA (US)

(73) Assignee: Ericsson AB, Stockholm (SE)

( * ) Notice: Subject to any disclaimer, the term of this patent is extended or adjusted under 35 U.S.C. 154(b) by 851 days.

(21) Appl. No.: 11/771,943

(22) Filed: Jun. 29, 2007

(65) Prior Publication Data

US 2009/0007239 A1    Jan. 1, 2009

(51) Int. Cl.
 *G06F 7/04* (2006.01)
(52) U.S. Cl. .................. 726/4; 726/2; 713/158
(58) Field of Classification Search .............. 726/2–5; 713/155–159, 168–181; 370/252, 328, 338, 370/389; 455/433; 709/220, 223
See application file for complete search history.

(56) References Cited

U.S. PATENT DOCUMENTS

| 7,197,549 | B1 | 3/2007 | Salama et al. | |
|---|---|---|---|---|
| 2004/0047348 | A1* | 3/2004 | O'Neill | 370/389 |
| 2005/0128956 | A1 | 6/2005 | Hsu et al. | |
| 2006/0153120 | A1* | 7/2006 | Channasamudhram | 370/328 |

FOREIGN PATENT DOCUMENTS

WO    WO 2007/061968    5/2007

OTHER PUBLICATIONS

"Cisco Mobile Wireless Home Agent Feature Guide", Cisco IOS Release 12.3(14)YX, Cisco Mobile Wireless Home Agent 3.0, Dec. 22, 2005, 183pp.

C. Perkins, Editor, "IP Mobility Support", Network Working Group, Request for Comments: 2002, Category: Standards Track, IBM, Oct. 1996, 73pp. http://www.ietf.org/rfc/rfc2002.txt.
C. Perkins, Editor, "IP Mobility Support for IPv4", Network Working Group, Request for Comments: 3344, Obsoletes: 3220, Category: Standards Track, Nokia Research Center, Aug. 2002, 93pp. http://rfc.net/rfc3344.txt.
S. Glass, "Registration Revocation in Mobile IPv4", Network Working Group, Request for Comments: 3543, Category: Standards Track, Sun Microsystems, Aug. 2003, 33pp.
F. Johansson, "Mobile IPv4 Extension for Carrying Network Access Identifiers", Network Working Group, Request for Comments: 3846, Category: Standards Track, ipUnplugged, Jun. 2004, 8pp.
International Search Report mailed Oct. 7, 2008, for related International Application No. PCT/US2008/068427, filed Jun. 26, 2008, 2 pages.
International Preliminary Report on Patentability, Application No. PCT/US20081068427, dated Jan. 5, 2010, 6 pages.

* cited by examiner

*Primary Examiner* — Kim Vu
*Assistant Examiner* — Suman Debnath
(74) *Attorney, Agent, or Firm* — Blakely, Sokoloff, Taylor & Zafman LLP (57) ABSTRACT

Techniques for Mobile IP bulk registration revocation are described herein. According to one embodiment, a first mobile agent of a mobile IP network sends a registration revocation message to a second mobile agent of the mobile IP network. The registration revocation message includes information identifying multiple home IP addresses of multiple mobile nodes whose registrations are to be revoked. In response to the registration revocation, the second mobile agent terminates bindings of services associated with multiple mobile nodes identified by the multiple home IP addresses and sends an acknowledgement message to the first mobile agent. Other methods and apparatuses are also described.

20 Claims, 8 Drawing Sheets

FIG. 1

```
┌─────────────────────────────────────┐
│ Agents (e.g., home or foreign       │
│ agents) of a mobile IP              │        200
│ (MIP) network advertise in the MIP  │        ───
│ network their                       │
│ capabilities to support registration│
│ revocation features                 │
│ (e.g., by marking an 'X' bit in an  │
│ advertisement                       │
│ message).                           │
│ 201                                 │
└─────────────────────────────────────┘
                  │
                  ▼
┌─────────────────────────────────────┐
│ A first agent sends a registration  │
│ request message to a                │
│ second agent, including information │
│ indicating whether                  │
│ the first agent supports bulk       │
│ revocation (e.g., by                │
│ appending an extension with         │
│ additional 'B' bit).                │
│ 202                                 │
└─────────────────────────────────────┘
                  │
                  ▼
┌─────────────────────────────────────┐
│ In response to the registration     │
│ request message, the                │
│ second agent responds with a        │
│ registration request                │
│ acknowledge message, including      │
│ information indicating              │
│ whether the second agent supports   │
│ bulk revocation                     │
│ (e.g., by appending an extension    │
│ with additional 'B' bit)            │
│ 203                                 │
└─────────────────────────────────────┘
                  │
                  ▼
┌─────────────────────────────────────┐
│ In response to certain events,      │
│ if both the first and               │
│ second agents support bulk          │
│ revocation, the first and           │
│ second agents may process the bulk  │
│ revocation                          │
│ messages received from each other.  │
│ 204                                 │
└─────────────────────────────────────┘
```

FIG. 2

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Type       |S|B|D|M|G|r|T|x|          Lifetime             |
+-+-+-+-+-+-+-+-+-+-+-+-+-+-+-+-+-+-+-+-+-+-+-+-+-+-+-+-+-+-+-+-+
|                         Home Address                          |
+-+-+-+-+-+-+-+-+-+-+-+-+-+-+-+-+-+-+-+-+-+-+-+-+-+-+-+-+-+-+-+-+
|                          Home Agent                           |
+-+-+-+-+-+-+-+-+-+-+-+-+-+-+-+-+-+-+-+-+-+-+-+-+-+-+-+-+-+-+-+-+
|                        Care-of Address                        |
+-+-+-+-+-+-+-+-+-+-+-+-+-+-+-+-+-+-+-+-+-+-+-+-+-+-+-+-+-+-+-+-+
|                                                               |
+                        Identification                         +
|                                                               |
+-+-+-+-+-+-+-+-+-+-+-+-+-+-+-+-+-+-+-+-+-+-+-+-+-+-+-+-+-+-+-+-+
| Extensions ...
+-+-+-+-+-+-+-+-
```

FIG. 3A
(Prior Art)

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Type       |    Code       |           Lifetime            |
+-+-+-+-+-+-+-+-+-+-+-+-+-+-+-+-+-+-+-+-+-+-+-+-+-+-+-+-+-+-+-+-+
|                         Home Address                          |
+-+-+-+-+-+-+-+-+-+-+-+-+-+-+-+-+-+-+-+-+-+-+-+-+-+-+-+-+-+-+-+-+
|                          Home Agent                           |
+-+-+-+-+-+-+-+-+-+-+-+-+-+-+-+-+-+-+-+-+-+-+-+-+-+-+-+-+-+-+-+-+
|                                                               |
+                        Identification                         +
|                                                               |
+-+-+-+-+-+-+-+-+-+-+-+-+-+-+-+-+-+-+-+-+-+-+-+-+-+-+-+-+-+-+-+-+
| Extensions ...
+-+-+-+-+-+-+-+-
```

In response to certain events (e.g., shut down, policy changes), a first agent sends a registration revocation message to a second agent, where the message identifies multiple home IP addresses of multiple mobile nodes whose registrations are being revoked (e.g., by setting a 'B' bit and home IP address ranges).
501

The second agent sends a registration revocation acknowledgment to the first agent, where the acknowledgment also identifies the multiple home IP addresses of multiple mobile nodes whose registrations are being revoked.
502

Both the first and second agents terminates the bindings of the home IP addresses identified by the registration revocation/acknowledgement messages and release the associated resources.
503

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |      Reserved     |I|        Reserved         |
+-+-+-+-+-+-+-+-+-+-+-+-+-+-+-+-+-+-+-+-+-+-+-+-+-+-+-+-+-+-+-+-+
|                         Home Address                          |
+-+-+-+-+-+-+-+-+-+-+-+-+-+-+-+-+-+-+-+-+-+-+-+-+-+-+-+-+-+-+-+-+
|                      Revocation Identifier                    |
+-+-+-+-+-+-+-+-+-+-+-+-+-+-+-+-+-+-+-+-+-+-+-+-+-+-+-+-+-+-+-+-+
| Extensions...
+-+-+-+-+-+-+-+-+-+-+-+-+-+-
| Authenticator...
+-+-+-+-+-+-+-+-+-+-+-+-+-+-
```

FIG. 7A
(Prior Art)

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Reserved       |I|B| Reserved  | Prefix Length |
+-+-+-+-+-+-+-+-+-+-+-+-+-+-+-+-+-+-+-+-+-+-+-+-+-+-+-+-+-+-+-+-+
|                       Home Address/Prefix                     |
+-+-+-+-+-+-+-+-+-+-+-+-+-+-+-+-+-+-+-+-+-+-+-+-+-+-+-+-+-+-+-+-+
|                      Revocation Identifier                    |
+-+-+-+-+-+-+-+-+-+-+-+-+-+-+-+-+-+-+-+-+-+-+-+-+-+-+-+-+-+-+-+-+
| Extensions...
+-+-+-+-+-+-+-+-+-+-+-+-+-+-
| Authenticator...
+-+-+-+-+-+-+-+-+-+-+-+-+-+-
```

MOBILE IP BULK REGISTRATION REVOCATION

FIELD OF THE INVENTION

The present invention relates generally to mobile IP networks. More particularly, this invention relates to mobile IP bulk registration revocation.

BACKGROUND

Mobile IP for IPv4 defines registration of a mobile node's location to provide connectivity between the mobile node and its home domain, facilitating communication between mobile nodes and any correspondent node. In Mobile IP network, each mobile node is identified by its home address, regardless of its current point of attachment to the Internet. While situated away from its home, a mobile node is also associated with a care-of address, which provides information about its current point of attachment to the Internet. Mobile IP is a protocol which provides for registering the care-of address with a home agent. The home agent sends datagrams destined for the mobile node through a tunnel to the care-of address (CoA). After arriving at the end of the tunnel, each datagram is then delivered to the mobile node. Further detailed information regarding Mobile IP for IPv4 can be found in RFC3344 published in 2002, which is incorporated by reference herein it its entirety.

At any time, either the home or foreign agent may wish to cease servicing a mobile node, or for administrative reasons may no longer be required to service a mobile node. RFC3543, published in 2003 (which is incorporated by reference herein it its entirety), defines a registration revocation mechanism where a mobile agent involved in providing Mobile IP services to a mobile node can notify another mobile agent providing Mobile IP services to the same mobile node of the termination of this registration. However, such a revocation mechanism is designed for notifying a single node at a time. For a mobile agent supporting multiple mobile nodes having different home addresses, multiple revocation messages have to be communicated among the mobile agents, which may cause significant network traffic and added processing load on the mobile agents.

SUMMARY OF THE DESCRIPTION

Techniques for Mobile IP bulk registration revocation are described herein. According to one embodiment, a first mobile agent of a mobile IP network sends a registration revocation message to a second mobile agent of the mobile IP network. The registration revocation message includes information identifying multiple home IP addresses of multiple mobile nodes whose registrations are to be revoked. In response to the registration revocation, the second mobile agent terminates bindings of services associated with multiple mobile nodes identified by the multiple home IP addresses and sends an acknowledgement message to the first mobile agent.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Techniques for Mobile IP bulk registration revocation are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to certain embodiments of the invention, a Mobile IP bulk registration revocation mechanism is utilized to support a single revocation message to revoke services of multiple mobile nodes. In a particular embodiment, the revocation support extension includes a specific bit to indicate whether a particular mobile agent supports bulk revocation. In addition, a revocation selection extension is added to further qualify bulk registration revocation. Further, the registration revocation registration includes a bit indicating whether the registration is a bulk registration. If it is a bulk revocation, the home agent address field of the revocation message specifies a range of home IP addresses of mobile nodes whose registrations are to be revoked. For example, according to one embodiment, the home agent address field of the revocation message includes a prefix rather than a specific mobile node's home address, where the prefix, in conjunction with a prefix length field, specifies multiple home addresses of multiple mobile nodes. Thus, a single registration revocation message can be used to revoke service bindings for multiple mobile nodes.

Figure 1:
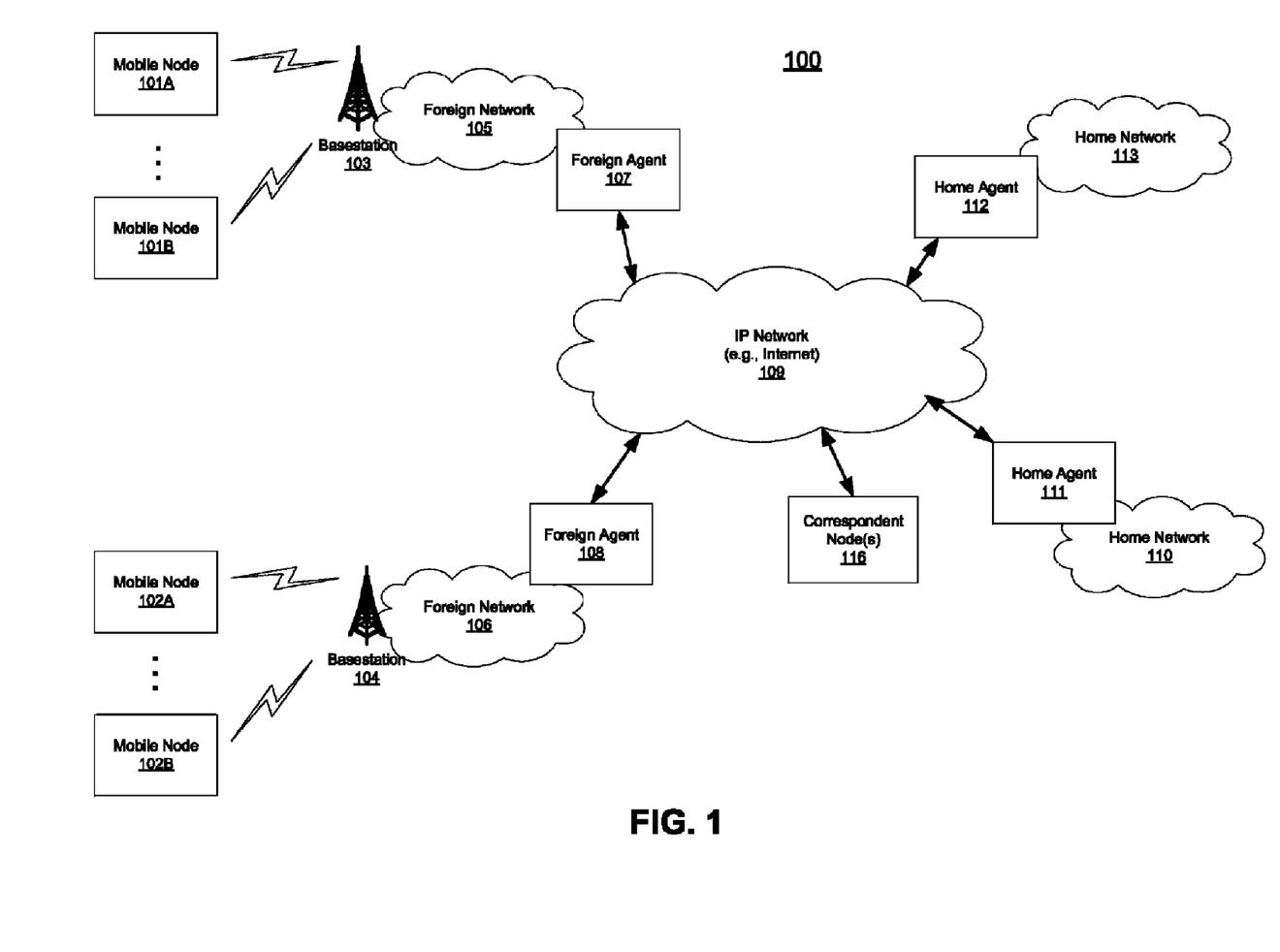
FIG. 1 is a block diagram illustrating an example of a Mobile IP network configuration according to one embodiment of the invention.

FIG. 1 is a block diagram illustrating an example of a Mobile IP network configuration according to one embodiment of the invention. Referring to FIG. 1, network configuration 100 includes, but is not limited to, a network 109, which may be the Internet or WAN (wide area network) over which mobile nodes 101-102 can communicate remotely via mediation by their corresponding home agents (e.g., home agents 111-112) and foreign agents (e.g., foreign agents 107-108). Typically, the home agent and foreign agent are routers or other network connection devices performing appropriate Mobile IP functions as implemented by software, hardware, or a combination of both.

In Mobile IP, a foreign agent may be a router on a mobile node's visited network that provides routing services to the mobile node to which it is registered. The foreign agent delivers datagrams to the mobile node that was tunneled by the mobile node's home agent. For datagrams sent by a mobile node, the foreign agent can serve as a default router for registered mobile nodes and provide reverse tunneling if required. In Mobile IP, a home agent may be a router on a mobile node's home network that tunnels datagrams to the mobile node when it is away from the home location, and maintains current location information for the mobile node. For example, any one of foreign agents 107-108 and home agents 111-112 (associated with home networks 110 and 113) may be an L2TP (layer 2 tunneling protocol) access concentrator (LAC) or a BRAS (broadband remote aggregation server), such as, for example, a SmartEdge™ router available from Redback Networks of San Jose, Calif.

Mobile nodes 101-102 may include any device capable of coupling to a wireless network such as foreign networks 105-106. Such devices may include cellular phones, smart phones, pagers, radio frequency (RF) devices, infrared (IR) devices, integrated devices combining one or more of the preceding devices, etc. Mobile nodes 101-102 may also include other devices that have a wireless interface such as personal digital assistants (PDAs), handheld computing devices, personal computers, consumer electronics devices, etc.

A particular mobile node plugged into its home network segment connects with the internet through its designated home agent. When the mobile node roams, the mobile node communicates via the Internet through an available foreign agent. Presumably, there are many foreign agents available at geographically disparate locations to allow wide spread internet connection via the Mobile IP protocol. Note that it is also possible for the mobile node to register directly with its home agent.

For the purpose of illustration, it is assumed that mobile node 101, which may include multiple mobile nodes 101A-101B, is associated with home network 110. Referring to FIG. 1, mobile node 101 normally resides on (or is "based at") a network segment 110 (also referred to as a home network) which allows its network entities to communicate over the network 109 through home agent 111. Network 109 may include the Internet, WAN, MAN (metropolitan area network), or a backbone core network.

Now, suppose that mobile node 101 moves away from its home network 110 and roams to a remote network segment 105 (also referred to as a foreign network). Foreign network 105 may include various other nodes. The nodes on foreign network 105 communicate with network 109 through the corresponding foreign agent 107. Mobile node 101 may identify foreign agent 107 through various solicitations and advertisements which form part of the Mobile IP protocol. When mobile node 101 engages with network segment 105, foreign agent 107 relays a registration request to home agent 111. The home agent 111 and foreign agent 107 may then negotiate the conditions of the mobile node's attachment to foreign agent 107. For example, the attachment may be limited to a predetermined period of time, such as two hours. When the negotiation is successfully completed, home agent 111 updates an internal "mobility binding table" which specifies the care-of address or CoA (e.g., a collocated care-of address or the foreign agent's IP address) in association with the identity of mobile node 101. Further, the foreign agent 107 updates an internal "visitor table" which specifies the mobile node address, home agent address, etc. In effect, the mobile node's home base IP address (associated with network segment 110) has been shifted to the foreign agent's IP address (associated with network segment 105).

Now, suppose that mobile node 101 wishes to send a message to a correspondent node such as node 116 from its new location (e.g., within foreign network 105). An output message from the mobile node 101 is then packetized and forwarded through foreign agent 107 over the network 109 and to correspondent node 116 according to a standard internet protocol. If correspondent node 106 wishes to send a message to mobile node 101, whether in reply to a message from the mobile node 101 or for any other reason, correspondent node 116 may address that message to the IP address of mobile node 101 on home network 110. The packets of that message are then forwarded over network 109 and to foreign agent 107.

From its mobility binding table, home agent 111 recognizes that mobile node 101 is no longer attached to network segment 110. Home agent 111 then encapsulates the packets from correspondent node 116 (which are addressed to mobile node 101 on network segment 110) according to a Mobile IP protocol and forwards these encapsulated packets to a "care of" address for mobile node 101. The care-of address may be, for example, the IP address of foreign agent 107. Foreign agent 107 then strips the encapsulation and forwards the message to mobile node 101 on network 105. The packet forwarding mechanism implemented by the home and foreign agents is often referred to as "tunneling".

Similarly, mobile node 102, which may include multiple mobile nodes 102A-102B, communicates with its home agent and other correspondent nodes of network 109 via basestation 104, foreign network 106, and foreign agent 108 in a similar manner described above.

Under certain circumstances, a mobile agent (e.g., home agent or foreign agent) may have to terminate its services (e.g., service bindings) to certain mobile nodes. For example, when a home agent or a foreign agent needs to shut down, the home agent or foreign agent has to terminate the services to the mobile nodes that are being serviced. Alternatively, when certain policies change that preclude a mobile agent to communicate with another mobile agent, the mobile agent has to terminate the services. As a result, a mobile agent that wishes to terminate services may revoke the registration of the mobile nodes being serviced by sending a registration revocation message to the corresponding mobile agent.

As described above, in a convention registration revocation as described in RFC3543, for each mobile node, a mobile agent has to send an individual revocation message to the other agent to revoke the services for the respective mobile node. Thus, if a mobile agent provides services to multiple mobile nodes having different home addresses, the mobile agent has to send multiple revocation messages which may unnecessarily increase the network traffic and processing load on the mobile agents.

According to certain embodiments of the invention, when a first mobile agent sends a registration revocation message to a second mobile agent to revoke registration of multiple mobile nodes, the first mobile agent can specify multiple home addresses of the multiple mobile nodes in a single registration revocation message to revoke service bindings of the specified home addresses of multiple mobile nodes. As a result, network traffic and processing load on the mobile agents for registration revocation may be greatly reduced.

Referring back to FIG. 1, for the purposes of illustration, it is assumed that mobile nodes 101A-101B are associated with foreign agent 107 and home agent 111. Each of the mobile nodes 101A-101B has a different home address associated with the home network 110. When for certain reasons, the foreign agent 107 wishes to revoke services associated with mobile nodes 101A-101B, foreign agent 107 may send a single registration revocation message to home agent 111. According to one embodiment, the foreign agent 107 indicates that the revocation is a bulk revocation and the foreign agent 107 specifies multiple home addresses of mobile nodes 101A-101B within the single registration revocation message. Likewise, if the home agent 111 wishes to revoke services associated with mobile nodes 101A-101B, home agent 111 may send a single registration revocation message to foreign agent 107 indicating that the revocation is a bulk registration and specifying the home addresses of mobile nodes 101A-101B.

Note that according to one embodiment, home agent 111 and foreign agent 107 send and/or process a bulk revocation message only if both the home agent 111 and foreign agent 107 support the bulk revocation feature. Thus, prior to sending a bulk revocation to a mobile agent, a mobile agent sending the bulk revocation message and the mobile agent receiving and processing the bulk revocation message have to negotiate with each other to indicate whether they support bulk revocation. According to one embodiment, a message extension of a registration request message and/or a registration reply message may be used to indicate whether a mobile agent supports the bulk revocation.

Figure 2:
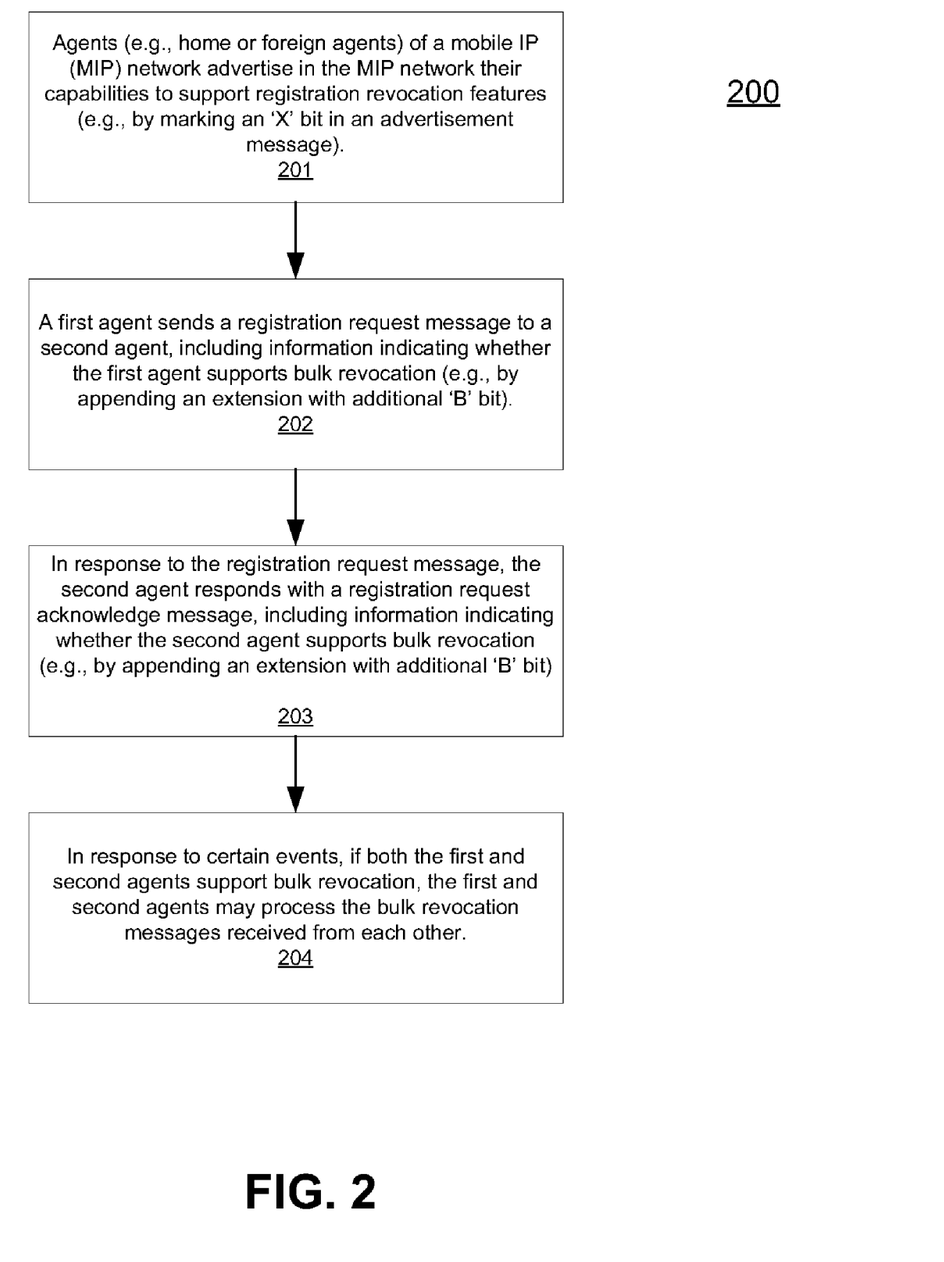
FIG. 2 is a flow diagram illustrating a process for advertising bulk revocation support according to one embodiment.
Figure 3A:
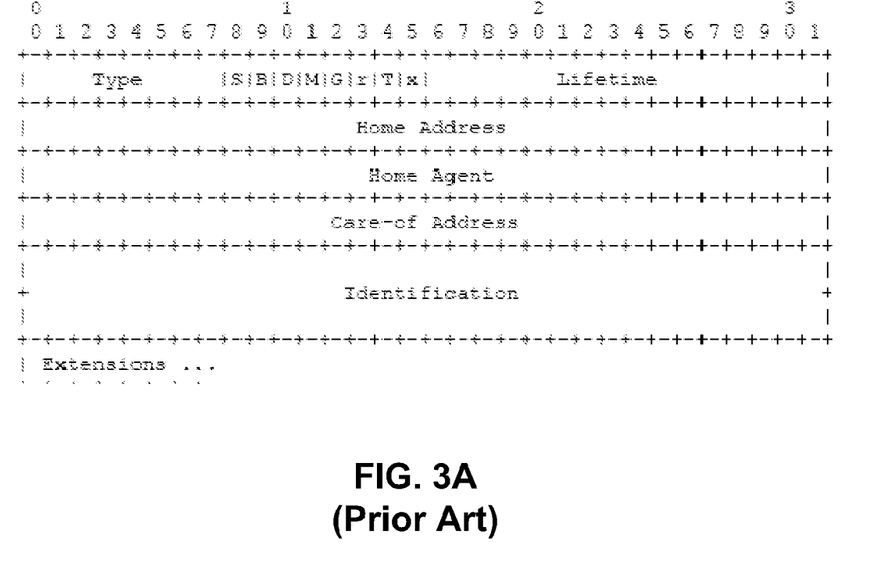
FIGS. 3A and 3B are conventional registration request and acknowledgement messages for Mobile IP.

FIG. 2 is a flow diagram illustrating a process for advertising bulk revocation support according to one embodiment. Note that process 200 may be performed by processing logic which may include hardware, software, or a combination of both. For example, process 200 may be performed by a home agent and/or a foreign agent as shown in FIG. 1. Referring to FIG. 2, at block 201, agents (e.g., home and/or foreign agents) of a Mobile IP network advertise their capabilities to support registration revocation features, such as, for example, by setting an 'X' bit in an advertisement message. At block 202, a first mobile agent sends a registration request message, as shown in FIG. 3A, to a second mobile agent. The registration request message includes information indicating whether the first mobile agent supports bulk revocation. For example, according to one embodiment, a first mobile agent may set a particular bit or bits of a message extension (e.g., bulk revocation support extension as shown in FIG. 4B) to the registration request message to indicate whether the bulk revocation is supported.

Figure 3B:
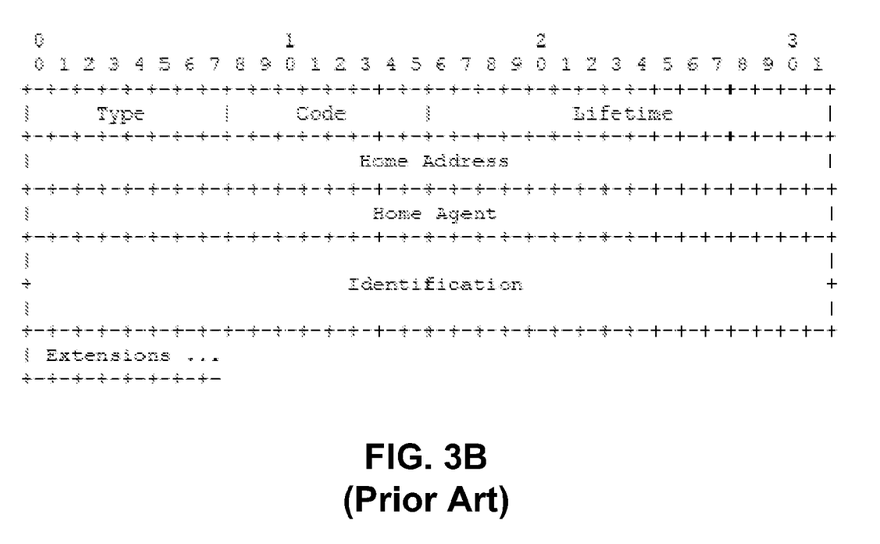

In response to the registration request message, at block 203, the second mobile agent responds with a registration reply message, as shown in FIG. 3B. In one embodiment, the second mobile agent also sets a particular bit or bits in a message extension associated with the registration reply message (e.g., message as shown in FIG. 4B) to indicate whether the second mobile agent supports the bulk revocation. Subsequently, at block 204, in response to certain events (e.g., shut down or withdrawal of CoA), if both the first and second agents support bulk revocation, either agent can send the other agent a single bulk revocation message to revoke services for multiple mobile nodes.

Figure 4A:
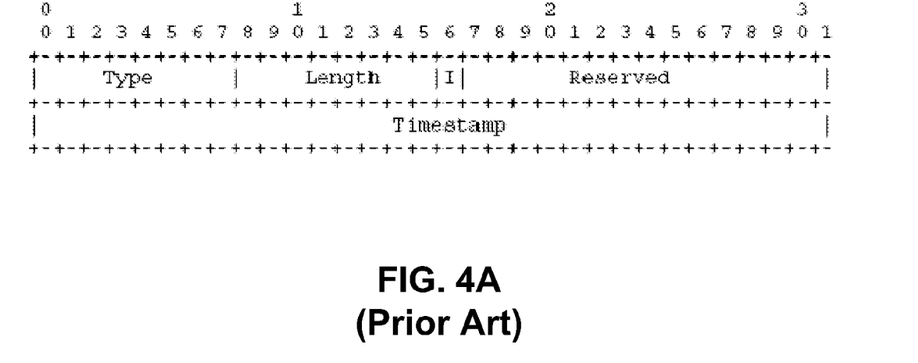
FIG. 4A is a typical registration revocation support message extension for Mobile IP.

FIG. 4A is a block diagram illustrating a typical revocation support message extension, which can be attached as an extension to a registration request message as shown in FIG. 3A and/or a registration reply message as shown in FIG. 3B. The extension message as shown in FIG. 4A is described in details in RFC 3543, which is used to indicate whether a mobile agent supports registration revocation. As described above, this message extension cannot be used to indicate whether a mobile agent supports bulk revocation.

Figure 4B:
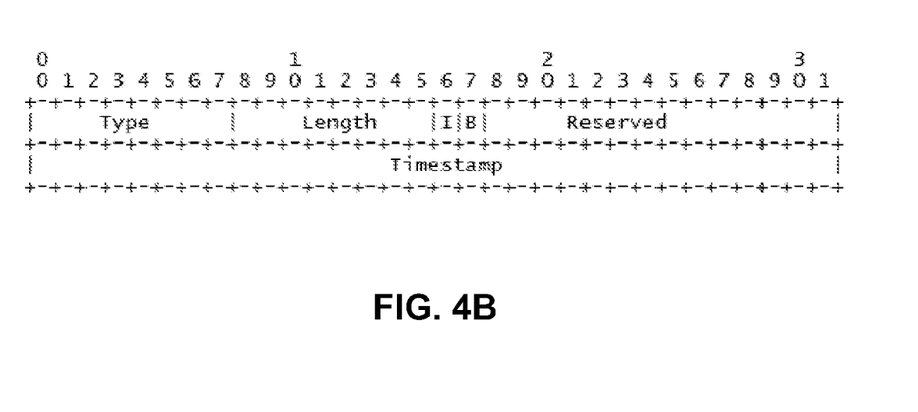
FIG. 4B is a bulk registration revocation support message extension for Mobile IP according to one embodiment.

FIG. 4B is a block diagram illustrating a bulk revocation support message extension according to one embodiment of the invention, which may also be attached as an extension to a registration request message as shown in FIG. 3A and/or a registration reply message as shown in FIG. 3B. With respect to the message extension as shown in FIG. 4A, the message extension as shown in FIG. 4B includes an additional bit, such as, for example, a 'B' bit, to indicate whether a mobile agent sending this message supports bulk revocation. When the 'B' bit is set to a predetermined value such as a logical value of one, it indicates that the mobile agent sending the message supports the bulk revocation. Otherwise, the mobile agent does not support the bulk revocation. Note that the 'B' bit and its position within the message extension are shown for illustration purposes only. Single bit or multiple bits, as well as different positions, may also be utilized for this purpose. Also note that bulk revocation can be negotiated globally between the mobile agents.

Figure 5:
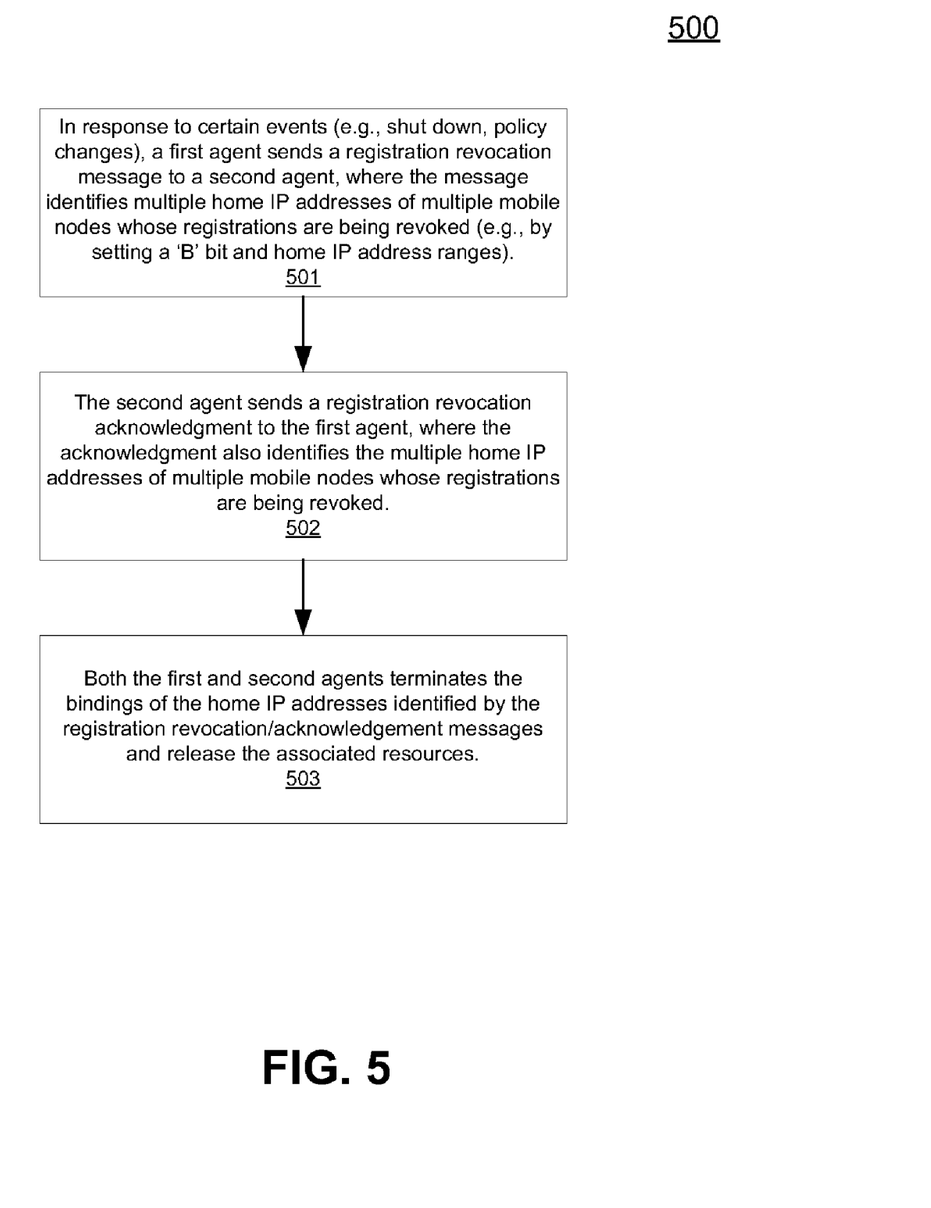
FIG. 5 is a flow diagram illustrating a process for bulk revocation according to one embodiment of the invention.

Once the mobile agents indicate to one another, the mobile agents may process the bulk registration revocation messages. FIG. 5 is a flow diagram illustrating a process for bulk revocation according to one embodiment of the invention. Note that process 500 may be performed by processing logic which may include hardware, software, or a combination of both. For example, process 500 may be performed by a home agent and/or a foreign agent as shown in FIG. 1. Referring to FIG. 5, in response to certain events (e.g., shut down or policy changes), at block 501, a first agent sends a registration revocation message to a second agent. The registration revocation message includes information identifying multiple home addresses of multiple mobile nodes whose registrations are to be revoked. In one embodiment, the first agent sets certain specific bit or bits in the revocation message to indicate that this revocation is a bulk revocation. In addition, the first agent specifies a range of home addresses of multiple mobile nodes in the revocation message. In response to the registration revocation message, at block 502, the second agent responds with an acknowledgment message. The acknowledgment message also acknowledges the home addresses received from the registration revocation message. Thereafter, at block 503, both of the first and second agents can terminate the mobile IP service bindings for the specified home addresses and release the associated resources as needed. Other operations may also be performed.

Figure 6A:
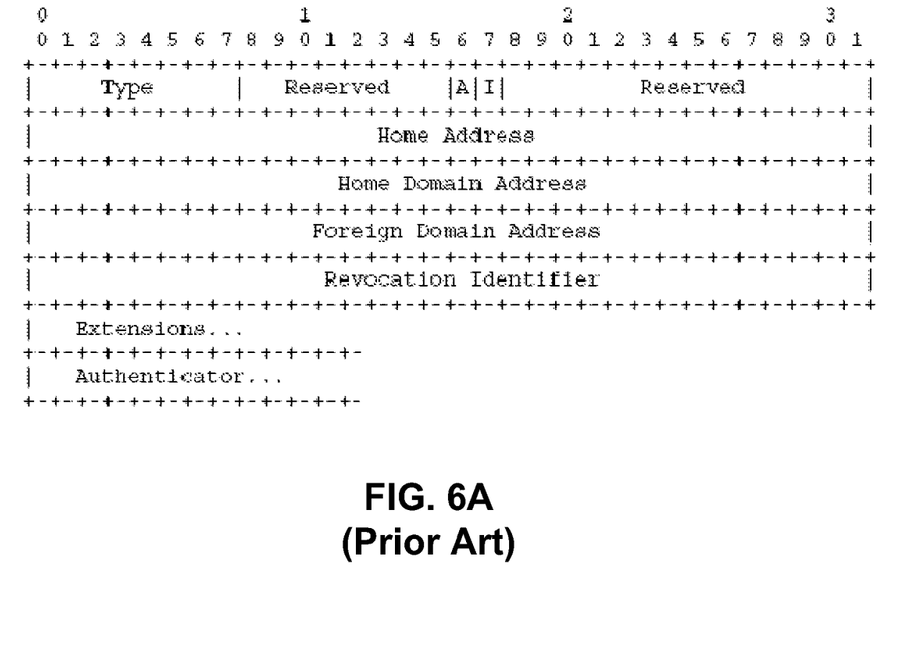
FIG. 6A is a typical registration revocation message for Mobile IP.

FIG. 6A is a block diagram illustrating a typical registration revocation message. The registration revocation message as shown in FIG. 6A is described in details in RFC 3543, which is used to revoke registration of a single mobile node. As described above, this message extension cannot be used to revoke registrations of multiple mobile nodes.

Figure 6B:
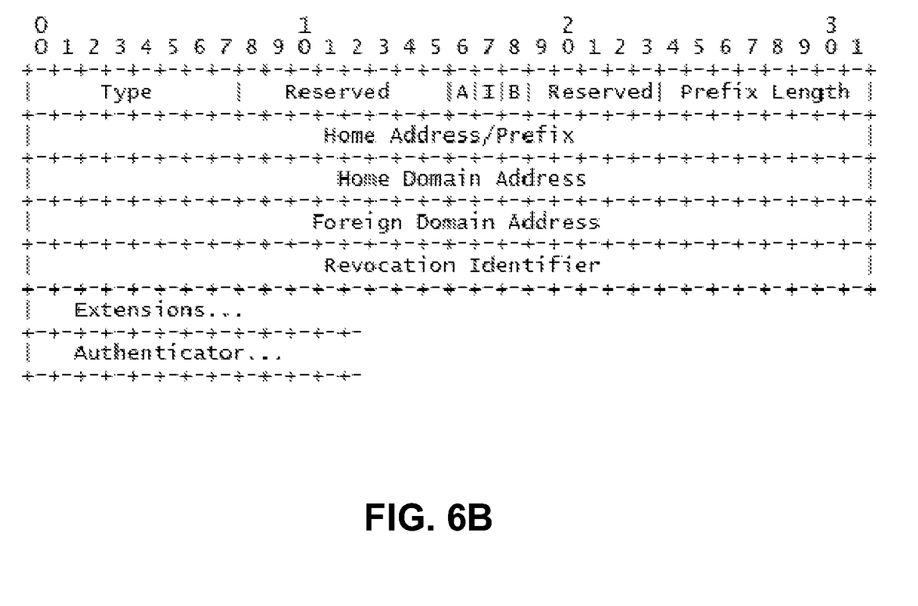
FIG. 6B is a bulk registration revocation message for Mobile IP according to one embodiment.

FIG. 6B is a block diagram illustrating a bulk registration revocation message according to one embodiment of the invention. Comparing to the revocation message as shown in FIG. 6A, the bulk revocation message as shown in FIG. 6B includes an additional bit, such as, for example, a 'B' bit, to indicate that this is a bulk registration revocation. As shown in FIG. 6B, when the 'B' bit is set to a predetermined value such as a logical value of one, it indicates that this registration revocation is a bulk registration revocation which may be applied to one or multiple registrations; otherwise, the registration revocation is similar to a conventional revocation message as shown in FIG. 6A. Note that the 'B' bit and its position within the bulk revocation message are shown for illustration purposes only. Single bit or multiple bits, as well as different positions, may also be utilized for this purpose.

According to one embodiment, the bulk revocation message further includes a home address/prefix field and a prefix length field, which when the 'B' bit indicates as a bulk revocation, to specify one or more home addresses of one or more mobile nodes whose registrations are to be revoked. The home address/prefix field may be used in conjunction with the prefix length field to select one or more registrations to be revoked. If the bulk revocation is not requested (e.g., the 'B' bit is set to zero), the home address/prefix field is used to specify a home address of a single mobile node whose registration is to be revoked. According to another embodiment, if the bulk revocation is requested (e.g., the 'B' bit is set to one) and the prefix length field has a value of zero, the registration revocation may be applied to all registrations for which the bulk revocation has been previously negotiated between the agents, for example, via the revocation support extension described above or a global negotiation mechanism. Note that the prefix length field and the home address/prefix field, as well as their positions within the message, are shown for purposes of illustration only; other formats may also be utilized.

Figure 7A:
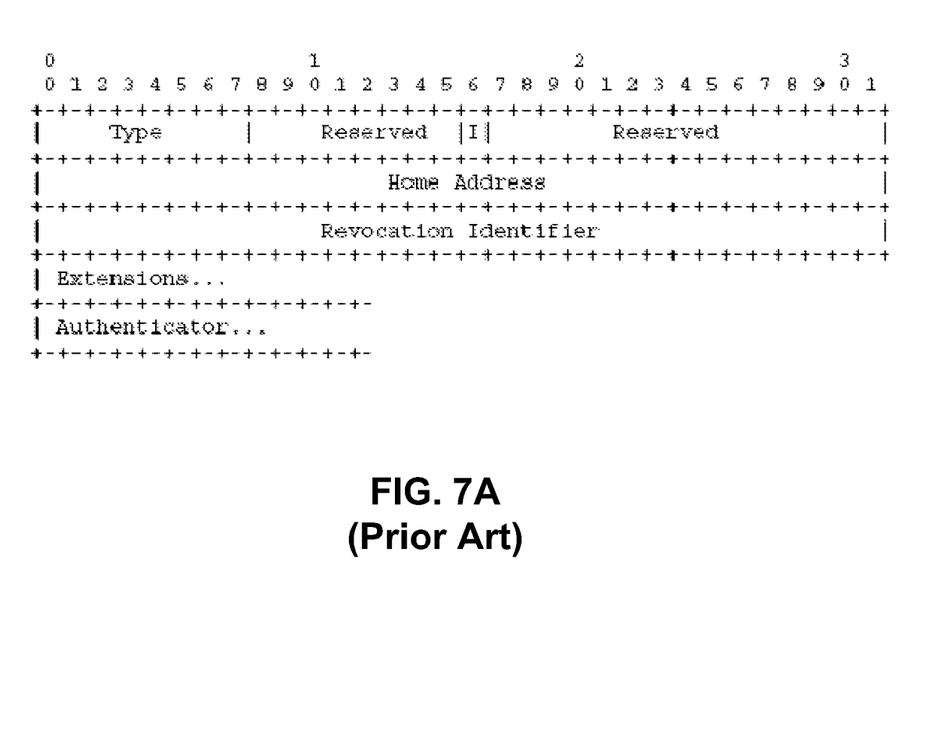
FIG. 7A is a typical registration revocation acknowledgement message for Mobile IP.
Figure 7B:
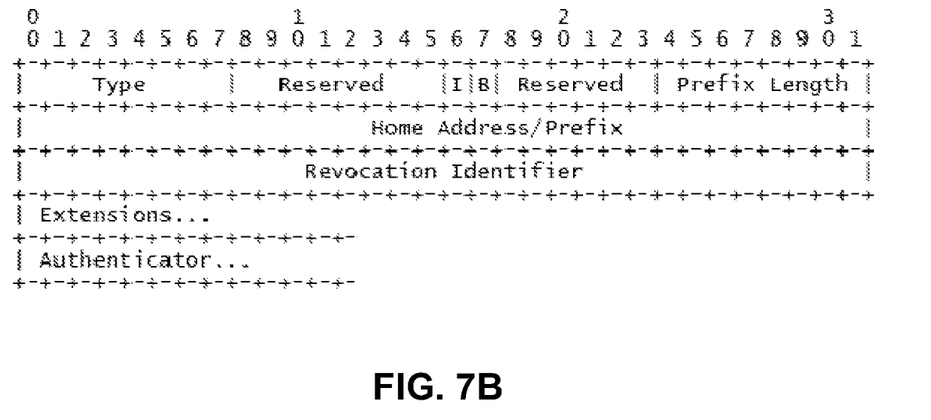
FIG. 7B is a bulk registration revocation acknowledgement message for Mobile IP according to one embodiment.

When a mobile agent receives a bulk registration revocation message as shown in FIG. 6B, according to one embodiment, the mobile agent may respond with an acknowledgement message as shown in FIG. 7B. Referring to FIG. 7B, as compared to a convention revocation acknowledgement message shown in FIG. 7A and described in RFC3543, the bulk revocation acknowledgement message in FIG. 7B includes a 'B' bit to indicate that this is a bulk revocation acknowledgement message. In addition, similar to the bulk revocation message of FIG. 6B, the bulk revocation acknowledgement message includes a prefix length field and a home address/prefix field, which should have values preferably matched with the corresponding ones in the bulk revocation message of FIG. 6B. Again, the 'B' bit, the prefix length field, and the home address/prefix field of the bulk revocation acknowledgement message of FIG. 7B are shown for purposes of illustration only. Other formats may also be utilized.

According to a further embodiment, a revocation selection extension may be used to further qualify a bulk revocation. The revocation selection extension may be attached as an extension to a bulk registration revocation message as shown in FIG. 6B. The format of the revocation selection extension may be implemented in a format similar to the type-length-subtype-value (TLV) short extension format described in RFC3344. In one embodiment, the type field of the extension may be set to a predetermined value indicating that this is a non-skippable type. The length field of the extension depends on the specific format of the extension indicated by the subtype field.

Figure 8A:
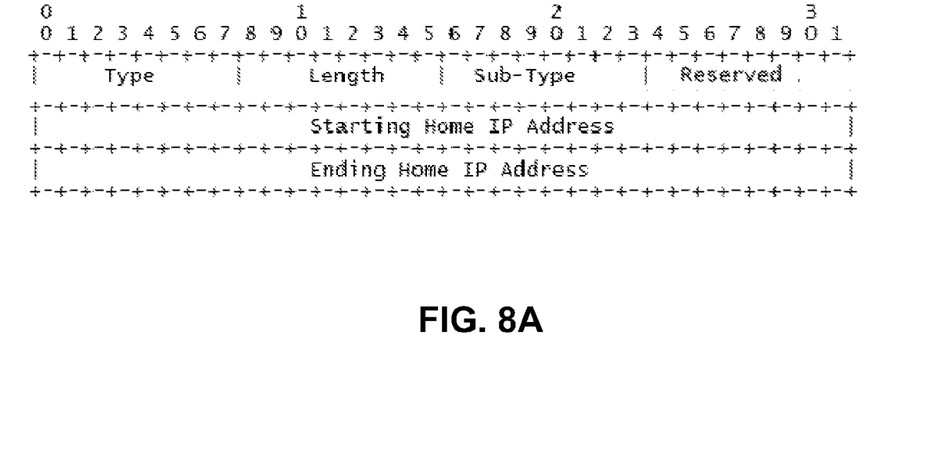
FIGS. 8A-8C are block diagrams illustrating certain formats of bulk revocation selection extensions according to certain embodiments of the invention.
Figure 8B:
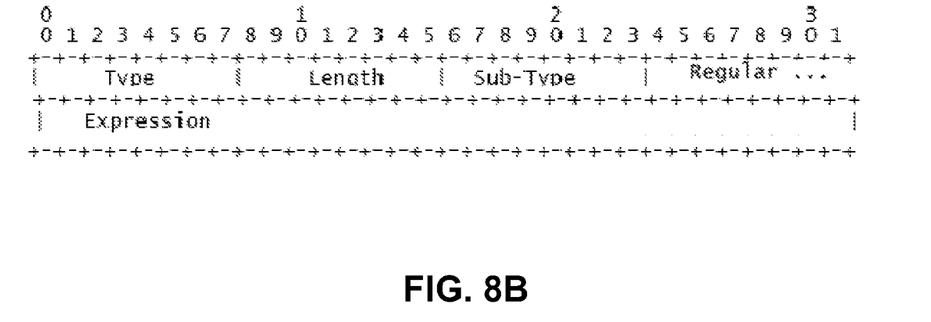
Figure 8C:
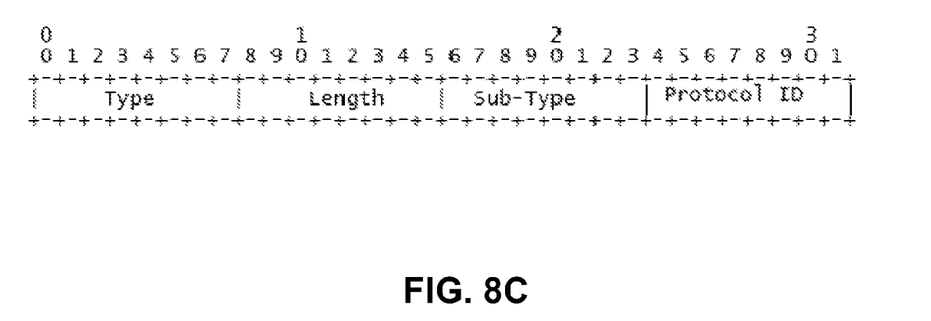

According to one embodiment, when a subtype field of the extension has a first predetermined value (e.g., a value of one), the extension may be used to further specify a starting and ending home addresses in a range of home IP addresses of multiple mobile nodes whose registrations are to be revoked, as shown in FIG. 8A. According to another embodiment, when a subtype field of the extension includes a second predetermined value (e.g., a value of two), the extension may be used to indicate that the TLV value contains a regular expression applied to the NAI (network access identifier) as shown in FIG. 8B. The NAI extension may be implemented similar to the one described in details in RFC3846 published in 2004, which is incorporated by reference herein it its entirety. According to a further embodiment, when a subtype field of the extension includes a third predetermined value (e.g., a value of three), it indicates that the TLV contains a tunnel encapsulation protocol identifier as shown in FIG. 8C. This indicates that the bulk revocation only applies to registrations using the specified tunnel encapsulation. Referring to FIG. 8C, the protocol ID field may indicate a specific type of encapsulation, such as IP-in-IP (e.g., value of 94), generic routing encapsulation (e.g., value of 47), and minimal IP encapsulation (e.g., value of 55). Again, the formats as shown in FIGS. 8A-8C are illustrated for purposes of illustration only; other formats may also be utilized.

According to certain embodiments, replay protection proceeds in a similar way as described in RFC3543. However, when assuring that the message is not a replayed message, the mobile agent (also referred to as a mobility agent) may have to check the timestamp to assure it is greater than the timestamp received from the most recently received mobility revocation support extension from the agent. One way to support this is to maintain the most recent per-peer timestamp for peer mobile agents. For co-located mobile nodes, there normally will be only one active registration.

As described above, the techniques described throughout this application may be performed by a home agent and/or a foreign agent. In view of a home agent, according to certain embodiments, the bulk revocation techniques may be used, but is not limited to, when an instance of the home agent gracefully shut down; when policy changes which precludes communication with a foreign agent; withdrawal of the home agent local address from services; home address pool deletion or change; and other policy changes resulting in multiple registrations being revoked. In view of a foreign agent, the bulk revocation techniques may be used, but is not limited to, when the foreign agent gracefully shut down; policy changes that preclude communications with a home agent; withdrawal of the CoA from the services; and other policy changes resulting in multiple registrations being revoked.

In general, bulk revocation is not that as useful to a direct co-located node since it usually has a single registration with a home agent. Hence, there is really no reason for a direct co-located node to negotiate bulk revocation in the first place by setting the 'B' bit in the revocation support extension appending to its initial registration. However, the techniques described above do not preclude support and a direct co-located node negotiating bulk revocation may support bulk revocation requests.

Thus, techniques for Mobile IP bulk registration revocation have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer implemented method performed by mobile agents for revoking services to a first mobile node and a second mobile node, the method comprising:
    a first mobile agent of a mobile IP network sending a single registration revocation message to a second mobile agent of the mobile IP network, the single registration revocation message including information identifying at least two home IP addresses of the first mobile node and information identifying at least two home IP addresses of the second mobile node, wherein registrations of the first mobile node and the second mobile node are to be revoked;
    in response to the single registration revocation, the second mobile agent terminating bindings of services associated with the first and second mobile nodes identified by the multiple home IP addresses and sending an acknowledgement message to the first mobile agent,
    negotiating between the first agent and the second agent to indicate whether both the first agent and second agent support a bulk revocation, wherein a bulk revocation is performed only if both the first and second agents support the bulk revocation, and
    setting a bit field in a revocation support extension associated with at least one of a registration request and a registration reply message to indicate whether a specific node that sends at least one of a registration request and a registration reply message supports the bulk revocation.

2. The method of claim 1, further comprising indicating via a bulk indication field of the single registration revocation message that the single registration revocation message is a bulk registration revocation message to revoke services for multiple mobile nodes.

3. The method of claim 2, further comprising specifying a range of home IP addresses via an address range field of the single registration revocation message, the range of home IP addresses associated with the first and second mobile nodes whose registrations are to be revoked.

4. The method of claim 3, wherein the address range field includes a home address prefix field and a prefix length field, and wherein a value of the home address prefix field in combination of a value of the prefix length field selects one or more registrations to be revoked.

5. The method of claim 3, further comprising specifying via a message extension of the single registration revocation message a starting home IP address and an ending home IP address of the range of the home IP addresses.

6. The method of claim 3, further comprising specifying via a message extension of the single registration revocation message a network address identifier (NAI) regular expression to match a NAI specified in a registration request message in order to further select which of the registrations to be revoked.

7. The method of claim 3, further comprising specifying via a message extension of the single registration revocation message a tunnel encapsulation protocol, wherein the bulk revocation is only performed on registrations using the specified tunnel encapsulation protocol.

8. A computer implemented method in a mobile agent for revoking services to a first mobile node and a second mobile node, the method comprising:
    a first mobile agent of a mobile IP network receiving a single registration revocation message to a second mobile agent of the mobile IP network, the single registration revocation message including information identifying at least two home IP addresses of the first mobile node and information identifying at least two home IP addresses of the second mobile node, wherein registrations of the first mobile node and the second mobile node are to be revoked;
    in response to the registration revocation, the first mobile agent terminating bindings of services associated with the first and second mobile nodes identified by the multiple home IP addresses and sending an acknowledgement message to the second mobile agent, negotiating between the first agent and the second agent to indicate whether both the first agent and second agent support a bulk revocation, wherein a bulk revocation is performed only if both the first and second agents support the bulk revocation, and setting a bit field in a revocation support extension associated with at least one of a registration request and a registration reply message to indicate whether a specific node that sends at least one of a registration request and a registration reply message supports the bulk revocation.

9. The method of claim 8, wherein the single registration revocation message indicates via a bulk indication field that the single registration revocation message is a bulk registration revocation message to revoke services for multiple mobile nodes.

10. The method of claim 9, wherein the single registration revocation message further specifies a range of home IP addresses via an address range field of the single registration revocation message, the range of home IP addresses associated with the first and second mobile nodes whose registrations are to be revoked.

11. A non-transitory tangible machine-readable medium having instructions stored therein, which when executed by a processor, cause the processor perform a method in a mobile agent for revoking services to a first mobile node and a second mobile node, the method comprising:

a first mobile agent of a mobile IP network receiving a single registration revocation message from a second mobile agent of the mobile IP network, the single registration revocation message including information identifying at least two home IP addresses of the first mobile node and information identifying at least two home IP addresses of the second mobile node, wherein registrations of the first mobile node and the second mobile node are to be revoked; and in response to the registration revocation, the first mobile agent terminating bindings of services associated with the first and second mobile nodes identified by the multiple home IP addresses and sending an acknowledgement message to the second mobile agent, negotiating between the first agent and the second agent to indicate whether both the first agent and second agent support a bulk revocation, wherein a bulk revocation is performed only if both the first and second agents support the bulk revocation, and setting a bit field in a revocation support extension associated with at least one of a registration request and a registration reply message to indicate whether a specific node that sends at least one of a registration request and a registration reply message supports the bulk revocation.

12. The non-transitory tangible machine-readable medium of claim 11, wherein the single registration revocation message indicates via a bulk indication field that the single registration revocation message is a bulk registration revocation message to revoke services for multiple mobile nodes.

13. The non-transitory tangible machine-readable medium of claim 12, wherein the single registration revocation message further specifies a range of home IP addresses via an address range field of the single registration revocation message, the range of home IP addresses associated with the first and second mobile nodes whose registrations are to be revoked.

14. The method of claim 10, wherein the address range field includes a home address prefix field and a prefix length field, and wherein a value of the home address prefix field in combination of a value of the prefix length field selects one or more registrations to be revoked.

15. The method of claim 10, wherein the single registration revocation message includes a message extension to specify a starting home IP address and an ending home IP address of the range of the home IP addresses.

16. The method of claim 10, wherein the single registration revocation message includes a message extension to specify a network address identifier (NAI) regular expression to match a NAI specified in a registration request message in order to further select which of the registrations to be revoked.

17. The method of claim 10, wherein the single registration revocation message includes a message extension to specify a tunnel encapsulation protocol, wherein the bulk revocation is only performed on registrations using the specified tunnel encapsulation protocol.

18. A computer implemented method performed by a mobile agent for revoking services to a first mobile node and a second mobile node, the method comprising:

a first mobile agent of a mobile IP network sending a single registration revocation message to a second mobile agent of the mobile IP network, the single registration revocation message including an address range field to specify a range of home IP addresses associated with the first mobile node and information identifying a range of home IP addresses associated with the second mobile node, wherein registrations of the first mobile node and the second mobile node are to be revoked and wherein the registration revocation message causes the second mobile agent to terminate bindings of services associated with the first and second mobile nodes identified by the multiple home IP addresses;

receiving an acknowledgement message from the second mobile agent indicating that the bindings of services associated with the first and second mobile nodes have been terminated by the second mobile agent;

negotiating between the first agent and the second agent to indicate whether both the first agent and second agent support a bulk revocation, wherein a bulk revocation is performed only if both the first and second agents support the bulk revocation; and setting a bit field in a revocation support extension associated with at least one of a registration request and a registration reply message to indicate whether a specific node that sends at least one of a registration request and a registration reply message supports the bulk revocation.

19. The method of claim 18, wherein the address range field includes a home address prefix field and a prefix length field, and wherein a value of the home address prefix field in combination of a value of the prefix length field selects one or more registrations to be revoked.

20. The method of claim 19, wherein the single registration revocation message includes a bulk indication field to indicate that the single registration revocation message is a bulk registration revocation message to revoke services for multiple mobile nodes.

* * * * *